US012578072B2

(12) United States Patent
Braun

(10) Patent No.: US 12,578,072 B2
(45) Date of Patent: Mar. 17, 2026

(54) ILLUMINATION BODY

(71) Applicant: GLP German Light Products GmbH, Karlsbad (DE)

(72) Inventor: Steven Braun, Karlsbad (DE)

(73) Assignee: GLP German Light Products GmbH, Karlsbad (DE)

( * ) Notice: Subject to any disclaimer, the term of this patent is extended or adjusted under 35 U.S.C. 154(b) by 0 days.

(21) Appl. No.: 18/639,898

(22) Filed: Apr. 18, 2024

(65) Prior Publication Data

US 2024/0263760 A1 Aug. 8, 2024

Related U.S. Application Data

(63) Continuation of application No. PCT/EP2022/079114, filed on Oct. 19, 2022.

(30) Foreign Application Priority Data

Oct. 19, 2021 (DE) ......................... 102021211798.8

(51) Int. Cl.

| | |
|---|---|
| ***F21V 3/00*** | (2015.01) |
| ***F21V 5/00*** | (2018.01) |
| ***F21V 14/06*** | (2006.01) |
| *F21Y 113/13* | (2016.01) |

(52) U.S. Cl.

CPC ................ *F21V 3/00* (2013.01); *F21V 5/008* (2013.01); *F21V 14/06* (2013.01); *F21Y 2113/13* (2016.08)

(58) Field of Classification Search

CPC ............. F21V 3/00; F21V 5/008; F21V 14/06

See application file for complete search history.

(56) References Cited

U.S. PATENT DOCUMENTS

| | | | |
|---|---|---|---|
| 9,062,845 B1 | 6/2015 | Tsai et al. | |
| 10,415,799 B1 | 9/2019 | Grove et al. | |
| 10,594,067 B2 | 3/2020 | Nittke | |
| 2006/0039160 A1* | 2/2006 | Cassarly ............ | G02B 27/0961 362/551 |

(Continued)

FOREIGN PATENT DOCUMENTS

| | | |
|---|---|---|
| CN | 102278713 A1 | 12/2011 |
| CN | 202756932 U | 2/2013 |

(Continued)

OTHER PUBLICATIONS

International Search Report in International application No. PCT/EP2022/079114,mailed on Mar. 9, 2023.

(Continued)

*Primary Examiner* — Christopher E Dunay

(74) *Attorney, Agent, or Firm* — PV IP PC; Wei Te Chung

(57) ABSTRACT

Illumination body, including: at least one illumination unit, wherein each illumination unit includes an illumination chip, optics, and a diffuser, wherein, when viewed in a radiation direction, the optics is arranged in front of the illumination chip, and the light emitted by the illumination chip and through the optics are configured to image along a first direction, and wherein, when viewed in the radiation direction, the diffuser is arranged in front of the illumination chip, and the light emitted by the illumination chip and through the diffuser is configured to emit in one or several second directions, different from the first direction.

14 Claims, 3 Drawing Sheets

(56) References Cited

U.S. PATENT DOCUMENTS

| | | | | |
|---|---|---|---|---|
| 2012/0155102 | A1* | 6/2012 | Melzner | F21V 5/04 362/510 |
| 2012/0287621 | A1* | 11/2012 | Lee | F21V 5/04 362/231 |
| 2023/0034494 | A1* | 2/2023 | Fernandez-Dorado | G01N 21/8806 |
| 2023/0251198 | A1* | 8/2023 | Menachem | G01N 21/9501 250/458.1 |
| 2024/0115120 | A1* | 4/2024 | Halderman | A61B 1/04 |

FOREIGN PATENT DOCUMENTS

| | | | | |
|---|---|---|---|---|
| CN | 208074734 | U | 11/2018 | |
| DE | 102007056270 | A1 * | 5/2008 | F21V 13/02 |
| DE | 202007003667 | U1 | 7/2008 | |
| DE | 202014010058 | U1 | 3/2016 | |
| DE | 202015103514 | U1 | 10/2016 | |
| EP | 3763569 | A1 | 1/2021 | |
| WO | 2014030149 | A2 | 2/2014 | |
| WO | 2021156475 | A1 | 8/2021 | |

OTHER PUBLICATIONS

Written Opinion of the International Search Authority in International application No. PCT/EP2022/079114,mailed on Mar. 9, 2023.

Russian Office Action issued in corresponding Russian Patent Application No. 2024113147 dated Nov. 22, 2024, 16 pages.

* cited by examiner

ILLUMINATION BODY

CROSS-REFERENCES TO RELATED APPLICATIONS

This application is a continuation of copending International Application No. PCT/EP2022/079114, filed Oct. 19, 2022, which is incorporated herein by reference in its entirety, and additionally claims priority from German Application No. DE 10 2021 211 798.8, filed Oct. 19, 2021, which is incorporated herein by reference in its entirety. Embodiments of the present disclosure relate to an illumination body with at least one illumination unit. According to embodiments, the illumination unit comprises an LED and/or optics.

BACKGROUND

The combination of LED and optics (or optical system) provides an excellent illumination behavior in addition to a very good light yield. Clear optical elements that ideally image the light, e.g. along the illumination direction, are often used. This advantageous technical behavior has disadvantages with respect to illumination techniques and stage equipment. Recognizing the disadvantages as well as finding the solution is part of the disclosure.

When using LED optics, the visual perception of the light is sometimes only given from the front and cannot be recognized from the side. The background for this lies in the clear optics usually used, which does not provide much illumination itself. The behavior is amplified with closed housings that comprise drivable lenses, in particular if the optics drives, or is driven, inwards and therefore remains invisible. Consequently, one cannot see the illumination area, also called "pixel", or at least not from every angle of view, with the exception of the frontal top view. Thus, there is a need for an improved approach.

Embodiments of the present disclosure are based on the object to adapt the advantageous technical optical properties of LED optics, in particular the heavily-focused radiation behavior, to such an extent that the above-described disadvantages are alleviated.

SUMMARY

An embodiment may have an illumination body, including: at least one illumination unit, wherein each illumination unit includes an illumination chip, optics, and a diffuser, wherein the optics, when viewed in a radiation direction, are arranged in front of the illumination chip, and the light emitted by the illumination chip and through the optics are configured to image along a first direction; wherein the diffuser, when viewed in the radiation direction, is arranged in front of the illumination chip, and the light emitted by the illumination chip and through the diffuser is configured to emit in one or several second directions, different from the first direction, wherein the diffuser, when viewed in the radiation direction, is arranged in front of the optics; or wherein the optics is arranged between the illumination chip and the diffuser, the diffuser having a ring shape, wherein the one or several second directions include different spatial directions, where one direction of the different spatial directions is offset with respect to the first direction by at least 75°, and wherein a distance of the optics to the illumination chip is variable along the first direction.

Another embodiment may have an illumination body, including: at least one illumination unit, wherein each illumination unit includes an illumination chip, optics, and a diffuser, wherein the optics, when viewed in a radiation direction, are arranged in front of the illumination chip, and the light emitted by the illumination chip and through the optics are configured to image along a first direction, wherein the diffuser, when viewed in the radiation direction, is arranged in front of the illumination chip, and the light emitted by the illumination chip and through the diffuser is configured to emit in one or several second directions, different from the first direction, wherein the diffuser, when viewed in the radiation direction, is arranged in front of the optics; or wherein the optics is arranged between the illumination chip and the diffuser, the diffuser having a ring shape, wherein the one or several second directions include different spatial directions, where one direction of the different spatial directions is offset with respect to the first direction by at least 45°, and wherein a distance of the optics to the illumination chip is variable along the first direction.

Embodiments of the present disclosure provide: an illumination body (or lighting body) with at least one illumination unit (or lighting unit), wherein each illumination unit includes an illumination chip (pixel or radiation area), optics, and a diffuser. When viewed in a radiation direction, the optics is arranged in front of the illumination chip, and the light emitted by the illumination chip and through the optics is configured to image along a first direction. When viewed in the radiation direction, the diffuser is arranged in front of the illumination chip, and the light emitted by the illumination chip is configured to emit in one or several second directions, different from the first direction, (e.g. to the side).

Embodiments of the present disclosure are based on finding that by using a diffuser, (e.g. in the form of a light ring), arranged in front of the illumination chip and/or slightly laterally offset, the ideal technical radiation properties are maintained, while at the same time generating stray light that enables a lateral illumination phenomenon (or appearance) or at least a light phenomenon (or appearance) that can be seen from the side. This has the advantage that the diffuser itself carries out illumination (or glows), that is corresponding to the luminous color of the chip, regardless of the optics or the current optical setting (zoom stage). Now, at each angle of view onto the front lens, the color that is set can be seen better and the pixel effects can also be perceived better at any angles, (e.g. camera angles).

According to embodiments, the diffuser achieves the following: the second direction is offset with respect to the first direction by at least 10°, or even at least 25°, or even at least 45°. This may relate to one or several second directions. According to further embodiments, the second directions may have different spatial directions, where at least one direction of the different spatial directions differs from the first direction by at least 10°, at least 25°, or at least 45°. According to embodiments, this has the technical effect that light radiated by the diffuser is arranged laterally at a spatial angle, (e.g. 45°), with respect to the first spatial direction. According to embodiments, it is advantageous that the diffuser is arranged with respect to a housing of the illumination body such that it is visible from an angle larger or equal to 45° with respect to the first spatial direction.

According to an embodiment, the diffuser has a ring shape. For example, this ring may be arranged circularly around the first spatial direction. For example, when assuming that the first spatial direction extends as a perpendicular line with respect to the optics, and the optics is realized by a round lens, for example, the ring-shaped (or annular) diffuser would extend as a ring around the optics. Thus, according to further embodiments, when viewed in the radiation direction, the diffuser is arranged around the optics and/or flush with the optics and/or in front of the optics (when viewed in the radiation direction). These positions enable a diffuse radiation. According to embodiments, the diffuser is opaque and/or has one or several partial reflection areas.

According to a further embodiment, the optics is not just realized by a simple lens, but also comprises an adjustment area. That is, according to embodiments, the optics is adjustable. Here, according to embodiments, the position of the optics can be varied, e.g. along the first direction. As a consequence, (e.g., the distance of the optics to the illumination chip) is varied/is varied along the first direction. As mentioned, the diffuser may be arranged in front of the optics. As a consequence, according to embodiments, the optics is provided between the illumination chip and the diffuser.

The above embodiments already explained that the diffuser may comprise a ring shape. Thus, this diffuser ring may also be arranged around the optics. As a consequence, at least with respect to its outer diameter, it is larger or equal to the outer diameter of the optics. According to an embodiment, with respect to its inner diameter, the ring may correspond to the outer diameter of the optics. Consequently, this leads to the fact that the diffuser ring is arranged around the optics.

In the above embodiments, it was assumed that the illumination body comprises at least one illumination unit. According to embodiments, the illumination body comprises several or at least two or three adjacently arranged illumination units. At this point, it is to be noted that, according to embodiments, the illumination chip is configured to emit light with a variable spectrum and/or colored light. For example, this may be realized by a means of an RGB illumination chip or several individual illumination elements together forming the illumination chip, with different colors (e.g. RGB).

BRIEF DESCRIPTION OF THE DRAWINGS

Embodiments of the present disclosure will be detailed subsequently referring to the appended drawings, in which.

DETAILED DESCRIPTION

Figure 1A:
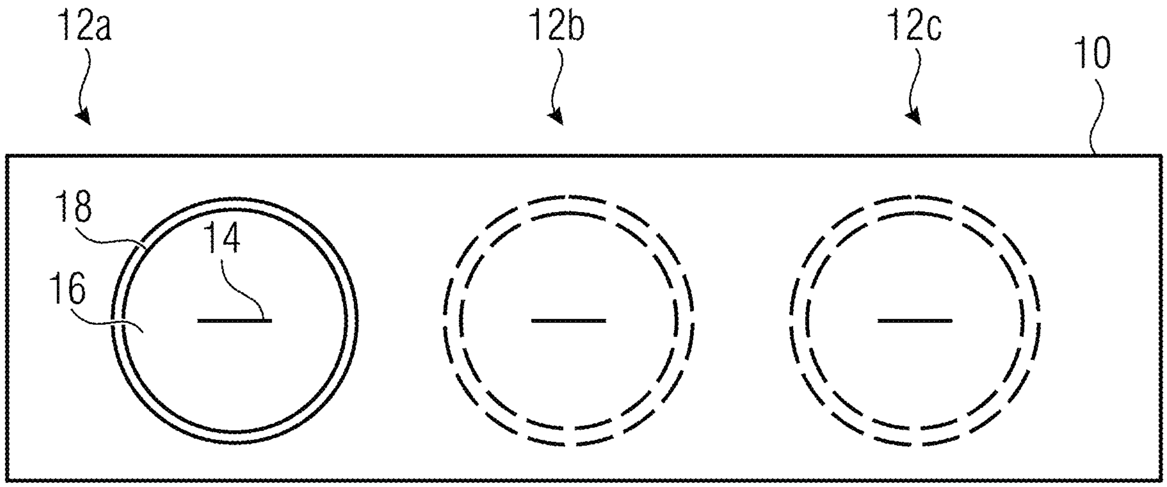
FIG. 1A shows a schematic illustration of an illumination body according to a base embodiment.

Before embodiments of the present disclosure are subsequently described on the basis of the accompanying drawings, it is to be noted that elements and structures having the same effect are provided with the same reference numerals so that their description can be applied to each other or is interchangeable.

FIG. 1A shows an illumination body 10 with three illumination elements 12*a*, 12*b* and 12*c*. At this point, it is to be noted that the illumination elements 12*a*, 12*b* and 12*c* may be structured in the same way or identically, wherein the illumination elements 12*b* and 12*c* are optional. In other words, the illumination body 10 may also comprise only one illumination element 12*a*.

Figure 1B:
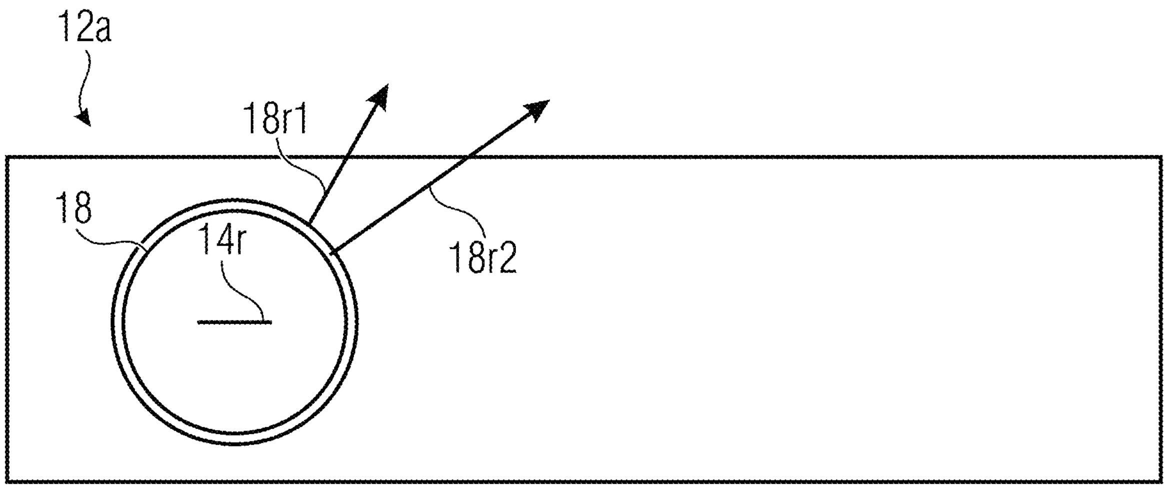
FIG. 1B shows a schematic illustration of the illumination body of FIG. 1A in order to explain properties of the diffuser according to extended embodiments.

The illumination element 12*a* includes the base elements illumination area 14, or illumination chip. The illumination unit 12*a* is an LED illumination unit according to embodiments so that the illumination chip 14 represents the LED chip. The illumination body 10 is illustrated in the front view so that, e.g., the radiation direction 14*r* (cf. FIG. 1B ) extends perpendicularly out of the plane. This first radiation direction, or the light along this first radiation direction, is collimated by optics 16. The optics may be realized by a lens or the like. In this embodiment, the lens 16 is round and is arranged in front of the illumination chip in the illumination direction 14*r*. By this, the light emitted by the illumination chip 14 is focused, e.g. in the direction 14*r*, assuming a converging lens or focus lens as the optics 16. In addition, the illumination unit 12*a* comprises a diffuser. For example, this diffuser may be arranged above or below or laterally or circularly in front of the illumination chip 14 in the radiation direction 14*r*. The diffuser is illuminated by the emission of the light of the illumination chip 14 and thus enables an additional radiation in a different spatial direction, e.g. the spatial direction 18*r*1 or 18*r*2, as illustrated in FIG. 1B. For example, assuming that the diffuser 18, or the diffuser ring 18, as arranged in front of the illumination chip 14 such that it is illuminated in the radiation direction, it is able to radiate light towards the side, in contrast to the function of the optical element 16. The optical body 16 focuses the light in the radiation direction 14*r* so that an ideal illumination is achieved at the desired point. The lateral arrangement of the diffuser 18, e.g. the annular arrangement of the diffuser 18 around the lens 16, advantageously makes it possible that there is no disadvantage for the illumination. Thus, the good illumination properties of the combination of LED and lens may be maintained, while a lateral diffuse light decoupling is made possible at the same time. In other words: in order to not influence the optical power of the zoom optics, according to embodiments, only one ring with diffuser material 18 was fixed to the front lens 16, and the center part remains clear for the light passage of the actual optics 16. This has the advantage that, at any zoom stage, this ring itself now carries out illumination (glows) due to the diffuser material by the light/stray light of the LED/optics. Now, at any angle of view with respect to the front lens, the color that is set can be seen, and the pixel effects can be perceived better at any camera angle, for example.

According to embodiments, the diffuser may comprise an opaque material or may have several total reflection areas. By assuming the embodiment to be a ring-shaped diffuser, it may either comprise a surface with several total reflection elements or also a simple bump or bulge.

According to embodiments, this simple bulge or the one or several total reflection areas may achieve that light is decoupled along a second decoupling direction 18*r* or 18*r*1, wherein 18*r*1 differs from the decoupling direction 14*r*. For example, the difference may include at least 10°, or even at least 25°, or even at least 45°. According to an embodiment, the light decoupled from the diffuser 18 is not only decoupled in one spatial direction, but in a multitude of spatial directions, here exemplarily the spatial directions 18*r*1 and 18*r*2. These spatial directions differ accordingly.

Subsequently, with reference to FIG. 2A-FIG. 2C, the advantage of this diffuser ring or of the diffuser 18 in general is described.

Figure 2A:
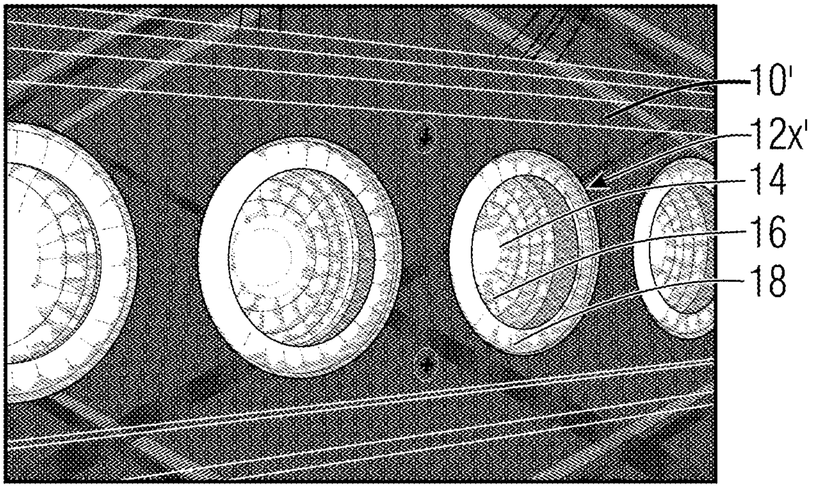
FIG. 2A shows schematic illustrations of an illumination body according to an additional embodiment.
Figure 2B:
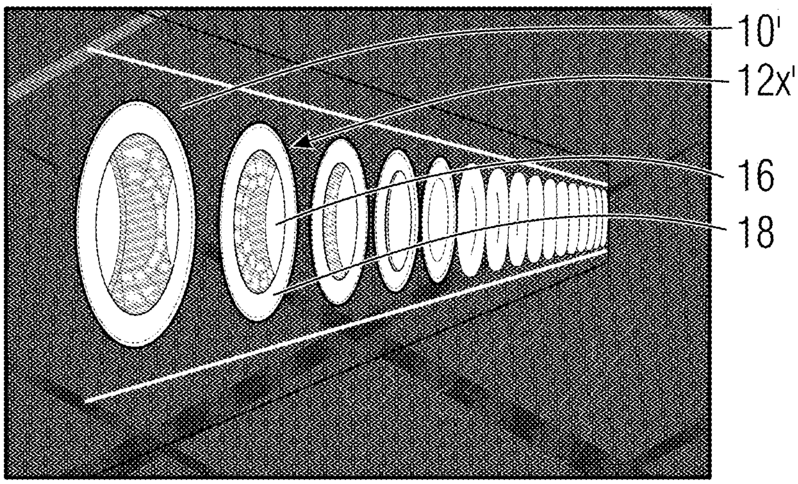
FIG. 2B shows schematic illustrations of an illumination body according to an additional embodiment.
Figure 2C:
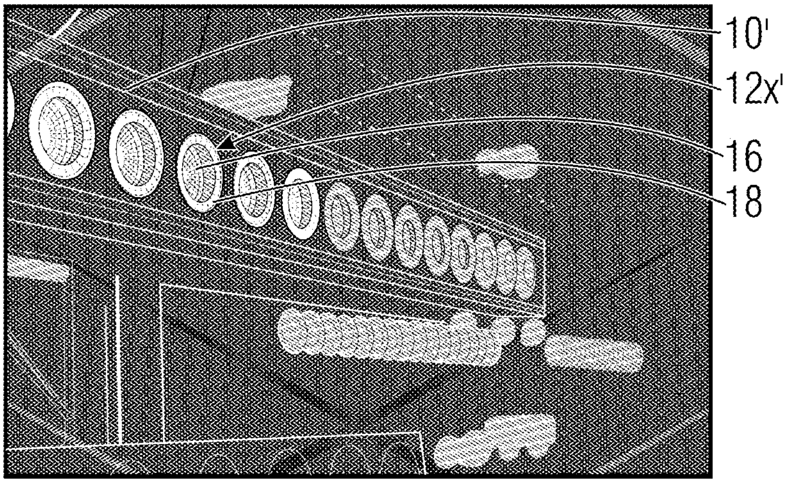
FIG. 2C shows schematic illustrations of an illumination body according to an additional embodiment.

FIG. 2A-FIG. 2C show a spotlight 10' or an illumination body 10' in general with a multitude of illumination elements 12*x*'. Each illumination element 12*x*' comprises an illumination chip 14, optics 16, and a diffuser 18. The illustrations 2*a*-2*c* differ due to the illustrated angle and due to color. Thus, it is clear that the illumination chip 14 is configured to emit different colors. In the illustration 2*a*, the color appearance can be retrieved in the area of the optics 16 and in the area of the diffuser. From the angle illustrated in FIG. 2B as well as the angle illustrated in FIG. 2C, it becomes clear that an unambiguous identification of the illumination functionality/the illumination properties is not possible from the side without the diffuser 18.

According to embodiments, the illumination body 10' may be an elongated illumination body with a multitude of adjacently arranged illumination elements 12*x*. For example, it may be 8, 10, 12, 14, or more illumination elements.

Figure 3:
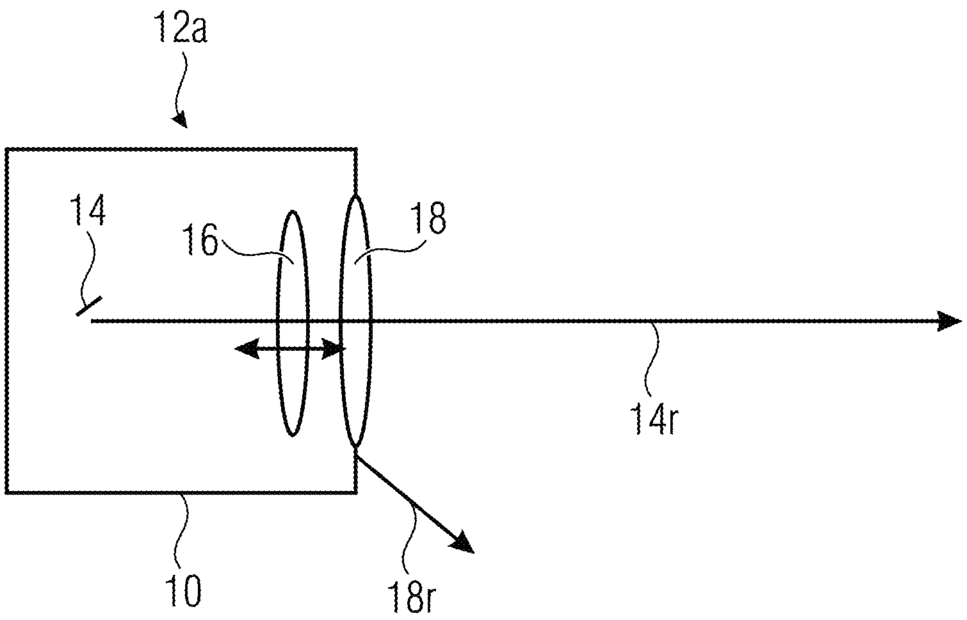
FIG. 3 shows a schematic illustration of the illumination body of FIG. 1A in a sectional view in order to explain further aspects according to embodiments.

The illumination body 10 of FIG. 1A is described with optional aspects with reference to FIG. 3. FIG. 3 shows a sectional view of the illumination body 10. On the front side of the illumination body 10, for example, there is the diffuser 18, wherein the front side is defined by the light being emitted along the first radiation direction 14*r*. In the rear area, e.g. in the rear third (when viewed in the radiation direction 14*r*), the illumination chip 14 is provided. The same emits light into different spatial directions, and in particular into the spatial direction 14*r*. The emitted light is focused by the optics 16, e.g., in the direction 14*r*. Depending on the position of the lens 16, with respect to the illumination chip 14, there is a stronger or weaker focus. Thus, according to embodiments, the lens 16 or the optics 16 in general can be varied in its relative position with respect to the illumination chip 14. For example, the distance between the optics 16 and the illumination chip 14 may be varied. As already described above, the diffuser, here a ring-shaped diffuser 18, is located in the front area, i.e. along the radiation direction 14*r*. Typically, this diffuser is provided as an opening of the housing 10 via which the light emitted by the illumination chip 14 is decoupled. With or without the use of the optics 16, the diffuser 18 is illuminated by the illumination chip 14 so that it emits (in a diffuse way) light in a further spatial direction 18*r*. As illustrated here, the further spatial direction 18*r* or the radiation direction 18*r* may differ from the radiation direction 14*r* by at least 10° or here even by approximately 40°. As described in connection with FIG. 1B, it would also be conceivable that the diffuser 18 serves several different spatial directions, e.g. 10°, 25°, 40°, 45°, 80°, and therefore emits light in these spatial directions. In this arrangement, it becomes clear that, according to embodiments, the displaceable lens 16 (displaceable along the spatial direction 14*r*) is provided between the diffuser 18 and the illumination element 14.

The above embodiments particularly assumed that the diffuser is provided as a type of diffuser ring. However, it would also be conceivable that a straight diffuser element is provided, e.g. laterally with respect to the main radiation direction 14*r* or the like. The diffuser ring may also define one, two, three, or several firmly defined directions in which the diffuser light is radiated. All embodiments have in common that, with respect to its property, e.g. with respect to its coloring/spectrum, the diffuse light is equal to or similar to the light emitted by the chip 14. According to embodiments, however, the intensity may be reduced.

The above embodiments are only illustrative. The protective scope is determined by the subsequent claims.

While this disclosure has been described in terms of several embodiments, there are alterations, permutations, and equivalents which fall within the scope of this disclosure. It should also be noted that there are many alternative ways of implementing the methods and compositions of the present disclosure. It is therefore intended that the following appended claims be interpreted as including all such alterations, permutations and equivalents as fall within the true spirit and scope of the present disclosure.

The invention claimed is:

1. Illumination body, comprising:

at least one illumination unit, wherein each illumination unit comprises an illumination chip, optics, and a diffuser, wherein the optics, when viewed in a radiation direction, are arranged in front of the illumination chip, and the light emitted by the illumination chip and through the optics are configured to image along a first direction, wherein the diffuser, when viewed in the radiation direction, is arranged in front of the illumination chip, and the light emitted by the illumination chip and through the diffuser is configured to emit in one or several second directions different from the first direction, wherein the diffuser, when viewed in the radiation direction, is arranged in front of the optics; or wherein the optics is arranged between the illumination chip and the diffuser, the diffuser having a ring shape, wherein the one or several second directions comprise different spatial directions, where one direction of the different spatial directions is offset with respect to the first direction by at least 75°, and wherein a distance of the optics to the illumination chip is variable along the first direction.

2. Illumination body according to claim 1, wherein the one direction of the different spatial directions differs from the first direction by at least 90°.

3. Illumination body according to claim 1, wherein the diffuser is arranged circularly around the first direction.

4. Illumination body according to claim 1, wherein the diffuser is at least partially opaque and comprises several total reflection areas.

5. Illumination body according to claim 1, wherein the optics is adjustable, wherein the position of the optics is variable along the first direction.

6. Illumination body according to claim 1, wherein the diffuser is arranged with respect to a housing of the illumination body such that it is visible from an angle larger than or equal to 45°, or larger than or equal to 75°, or larger than or equal to 90° with respect to the first direction.

7. Illumination body according to claim 1, wherein the illumination chip is configured to emit light with a variable spectrum or colored light.

8. Illumination body according to claim 1, wherein the illumination body comprises at least two adjacently arranged illumination units.

9. Illumination body according to claim 1, wherein an outer diameter of the diffuser is larger or equal to an outer diameter of the optics, wherein an inner diameter of the diffuser corresponds to an outer diameter of the optics, or wherein the diffuser is arranged around the optics.

10. Illumination body according to claim 1, wherein the diffuser comprising a ring shape having an inner diameter, wherein the inner diameter substantially complies to an outer diameter of the optics.

11. Illumination body according to claim 1, wherein at least one direction of the different spatial direction is offset with respect to the first direction by at least 90°.

12. Illumination body, comprising:

at least one illumination unit, wherein each illumination unit comprises an illumination chip, optics, and a diffuser, wherein the optics, when viewed in a radiation direction, are arranged in front of the illumination chip, and the light emitted by the illumination chip and through the optics are configured to image along a first direction, wherein the diffuser, when viewed in the radiation direction, is arranged in front of the illumination chip, and the light emitted by the illumination chip and through the diffuser is configured to emit in one or several second directions different from the first direction, wherein the diffuser, when viewed in the radiation direction, is arranged in front of the optics; or wherein the optics is arranged between the illumination chip and the diffuser, the diffuser having a ring shape, wherein the one or several second directions comprise different spatial directions, where one direction of the different spatial directions is offset with respect to the first direction by at least 45°, and wherein a distance of the optics to the illumination chip is variable along the first direction.

13. Illumination body according to claim 12, wherein the diffuser comprising a ring shape having an inner diameter, wherein the inner diameter substantially complies to an outer diameter of the optics.

14. Illumination body according to claim 12, wherein at least one direction of the different spatial direction is offset with respect to the first direction by at least 90°.

* * * * *